(12) United States Patent
Sagara

(10) Patent No.: US 10,507,530 B2
(45) Date of Patent: Dec. 17, 2019

(54) CUTTING TOOL

(71) Applicant: TUNGALOY CORPORATION, Fukushima (JP)

(72) Inventor: Katsuhiro Sagara, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 0 days.

(21) Appl. No.: 16/112,933

(22) Filed: Aug. 27, 2018

(65) Prior Publication Data

US 2019/0061016 A1 Feb. 28, 2019

(30) Foreign Application Priority Data

Aug. 30, 2017 (JP) .................. 2017-165206
Jun. 27, 2018 (JP) .................. 2018-121621

(51) Int. Cl.
*B23B 27/04* (2006.01)
*B23B 27/16* (2006.01)

(52) U.S. Cl.
CPC .......... *B23B 27/1607* (2013.01); *B23B 27/04* (2013.01); *B23B 2200/242* (2013.01); *B23B 2200/369* (2013.01)

(58) Field of Classification Search
CPC ...... B23B 2200/242; B23B 2200/3609; B23B 2200/0423; B23B 2200/241; B23B 2200/243; B23B 27/045; B23B 27/04; B23B 27/1611; B23B 27/1622; B23B 29/043; B23C 2200/246; B23C 2200/243
See application file for complete search history.

(56) References Cited

U.S. PATENT DOCUMENTS 4,643,620 A * 2/1987 Fujii ................. B23B 27/145
 407/119
4,778,311 A * 10/1988 Niemi ................ B23B 27/045
 407/116

(Continued)

FOREIGN PATENT DOCUMENTS

JP 61159341 A * 7/1986 .......... B23B 27/145
JP 2512995 B2 * 7/1996 .............. B23C 5/06

(Continued)

OTHER PUBLICATIONS

Description JPWO2017073590 (translation) obtained at https://worldwide.espacenet.com/ (last visited Jul. 12, 2019).*

(Continued)

*Primary Examiner* — Ryan C Rufo
(74) *Attorney, Agent, or Firm* — Studebaker & Brackett PC

(57) ABSTRACT

Provided is a cutting tool that simultaneously improves both fracture resistance and wear resistance. The cutting tool according to the present invention has an end surface, a peripheral side surface intersecting with the end surface, and a cutting edge in an intersecting ridge part along the end surface and the peripheral side surface, and when first and second points A and B are defined on the cutting edge, the first point A protrudes further toward an outer side of the cutting tool than the second point B. The cutting edge has a honing surface. The honing surface has a portion, the width of which gradually increases from the first point A toward the second point B.

7 Claims, 12 Drawing Sheets

(56) References Cited

U.S. PATENT DOCUMENTS

| | | | | |
|---|---|---|---|---|
| 4,890,961 A * | 1/1990 | Carl | ............... | B23B 27/04 |
| | | | | 407/105 |
| 5,135,336 A * | 8/1992 | Noguchi | ............... | B23B 27/045 |
| | | | | 407/117 |
| 5,447,396 A * | 9/1995 | Pantzar | ............... | B23C 5/207 |
| | | | | 407/113 |
| 5,771,763 A * | 6/1998 | Naslund | ............... | B23B 27/145 |
| | | | | 407/113 |
| 5,776,588 A * | 7/1998 | Moriguchi | ............... | B23B 27/145 |
| | | | | 407/119 |
| 6,761,510 B2 * | 7/2004 | Kinukawa | ............... | B23B 27/145 |
| | | | | 407/113 |
| 6,802,677 B2 * | 10/2004 | Shaffer | ............... | B24B 3/00 |
| | | | | 407/113 |
| 7,765,902 B2 * | 8/2010 | Kuroda | ............... | B23B 27/145 |
| | | | | 407/113 |
| 2001/0014259 A1 * | 8/2001 | Inayama | ............... | B23B 27/045 |
| | | | | 407/116 |
| 2004/0101374 A1 * | 5/2004 | Ejderklint | ............... | B23B 27/045 |
| | | | | 407/114 |
| 2005/0147475 A1 * | 7/2005 | Nagaya | ............... | B23C 5/109 |
| | | | | 407/42 |
| 2008/0075547 A1 * | 3/2008 | Wolf | ............... | B23B 27/141 |
| | | | | 408/147 |
| 2010/0119314 A1 * | 5/2010 | Nagaya | ............... | B23B 27/04 |
| | | | | 407/113 |
| 2011/0135406 A1 * | 6/2011 | Ishida | ............... | B23C 5/06 |
| | | | | 407/40 |
| 2013/0315682 A1 * | 11/2013 | Wahlsten | ............... | B23B 27/141 |
| | | | | 407/113 |
| 2016/0297010 A1 * | 10/2016 | Kukino | ............... | B24B 3/34 |
| 2018/0326502 A1 * | 11/2018 | Athad | ............... | B23B 27/1611 |

FOREIGN PATENT DOCUMENTS

| | | | | |
|---|---|---|---|---|
| JP | 09019819 A | * | 1/1997 | |
| JP | 09207007 A | * | 8/1997 | |
| JP | 2007-203379 A | | 8/2007 | |
| JP | 2009-12118 A | | 1/2009 | |
| JP | 2010-228016 A | | 10/2010 | |
| JP | 2011-110654 A | | 6/2011 | |
| JP | 2011-167805 A | | 9/2011 | |
| SU | 753549 A1 | * | 8/1980 | ........... B23B 27/005 |
| SU | 1247171 A1 | * | 7/1986 | ............ B23B 27/04 |
| SU | 1414509 A1 | * | 8/1988 | ........... B23B 27/045 |
| WO | 2012/023325 A1 | | 2/2012 | |
| WO | WO-2012023325 A1 | * | 2/2012 | ........... B23B 27/145 |
| WO | WO-2017073590 A1 | * | 5/2017 | ............ B23B 27/14 |
| WO | WO-2018233861 A1 | * | 12/2018 | ............ B23B 27/04 |

OTHER PUBLICATIONS

Description SU 1247171A1 (translation) obtained at https://dialog.proquest.com/professional/patents/lookuppatent?accountid=161361 (last visited Jul. 15, 2019).*

* cited by examiner

CUTTING TOOL

BACKGROUND

Field

The present invention relates to a cutting tool used in cutting processing.

Description of Related Art

Some cutting tools for cutting processing are provided with a honing surface on a cutting edge thereof in order to strengthen the cutting edge. A size of the honing surface may be varied among portions of the cutting edge. For example, in a cutting insert for cutting-off or grooving described in Japanese Patent Application Publication No. 2010-228016, a coating layer coats a surface of a base, a cutting edge with honing is formed, and a size of the honing of a nose cutting edge is made larger than a size of the honing of a linear cutting edge. In addition, a thickness of the coating layer on the nose cutting edge is made greater than a thickness on the linear cutting edge.

SUMMARY

Increasing a width of a honing surface at both end parts of a cutting edge in a similar manner to the cutting insert described in Japanese Patent Application Publication No. 2010-228016 when imparting a large honing surface to the cutting edge in order to strengthen the cutting edge may increase cutting resistance of the cutting edge at both end parts and may degrade quality of a finished surface of a processed workpiece. In particular, in a cutting tool with which cutting is started from one end side of a cutting edge which is closer to a workpiece due to the one end side protruding more outward than another end side, it may be desirable to prevent cutting resistance of the protruding one end side of the cutting edge from increasing in order to improve quality of a finished surface of a workpiece.

The cutting tool according to the present invention is a cutting tool having an end surface, a peripheral side surface intersecting with the end surface, and a cutting edge in an intersecting ridge part along the end surface and the peripheral side surface, wherein when first and second points A and B are defined on the cutting edge, the first point A protrudes further toward an outer side of the cutting tool than the second point B. The cutting edge has a honing surface. The honing surface has a portion the width of which gradually increases from the first point A toward the second point B.

In addition, a cutting insert includes: an upper surface on which a rake surface is formed; a first side surface which connects to the upper surface and on which a flank is formed; a second side surface which connects to the upper surface and the first side surface; a third side surface which connects to the upper surface and the second side surface; a fourth side surface which connects to the upper surface, the first side surface, and the third side surface; a lower surface which connects to the first side surface, the second side surface, the third side surface, and the fourth side surface; and a cutting edge which is formed in a connecting part between the upper surface and the first side surface and which has a honing surface, wherein a hole penetrating the second side surface and the fourth side surface is formed, and the cutting insert performs a cutting-off process in a state where the cutting insert is fixed to a holder by bringing a part of the fourth side surface into contact with the holder by using a male screw inserted into the hole and, at the same time, bringing at least respective parts of the upper surface and the lower surface into contact with the holder. In addition, the cutting edge is formed such that: in a top view from a direction opposing the upper surface, the cutting edge is inclined with respect to the second side surface and the fourth side surface so that a distance from the cutting edge to a central axis of the hole increases toward the fourth side surface from the second side surface; and in the top view, a width of the honing surface gradually increases toward a second point, which is closer to the second side surface than to the fourth side surface on the cutting edge, from a first point, which is closer to the fourth side surface than to the second side surface on the cutting edge.

Desirably, a distance between the first point A and the second point B is equal to or greater than half of a total length of the cutting edge. In addition, the first point A or the second point B may be an end part of the cutting edge.

DETAILED DESCRIPTION

Figure 1:
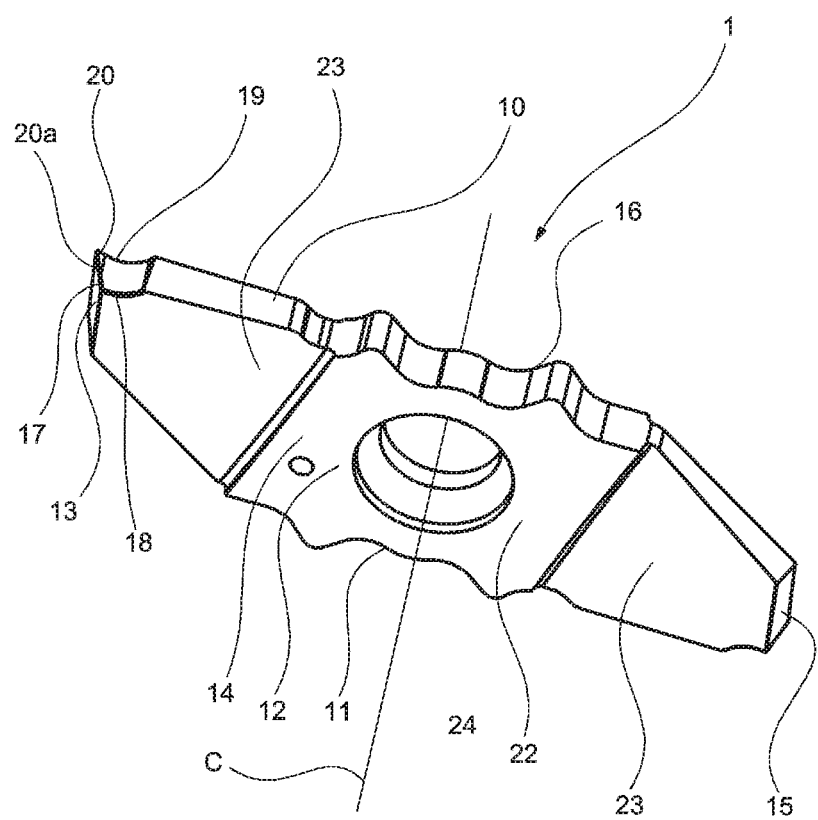
FIG. 1 is a perspective view of a cutting tool (a cutting insert) according to a first embodiment of the present invention.
Figure 2:
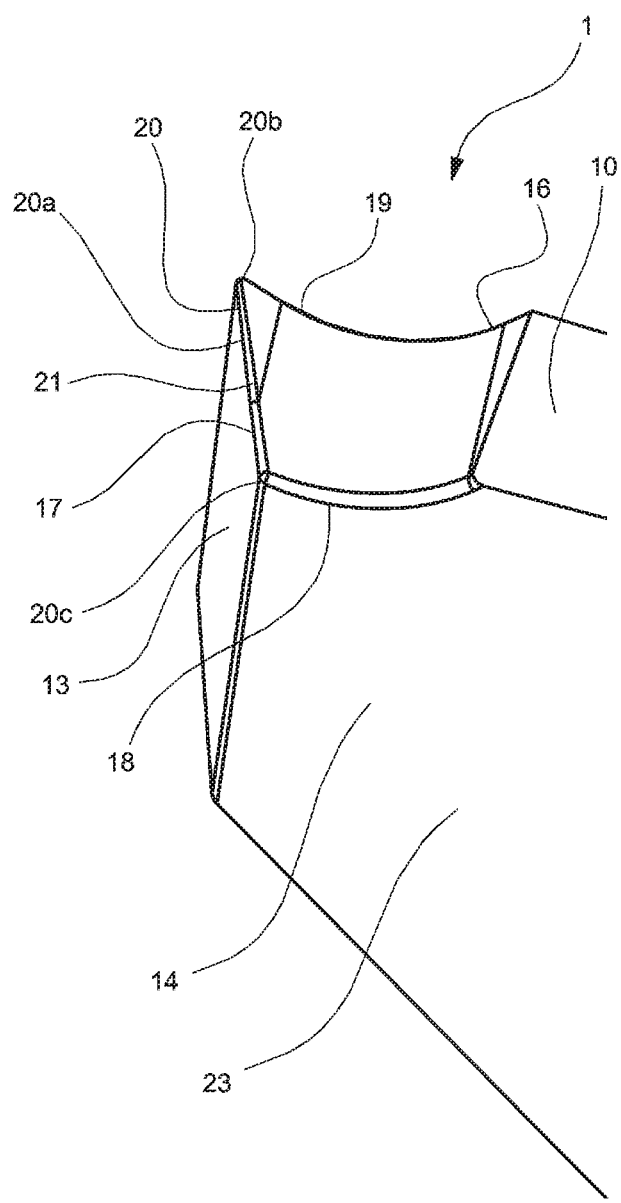
FIG. 2 is a partially enlarged perspective view of the cutting tool shown in FIG. 1.

Hereinafter, preferred embodiments of the present invention will be described with reference to the drawings. Note that same elements will be denoted by same reference characters and redundant descriptions will be omitted. In addition, unless otherwise noted, positional relationships such as up, down, left, and right are based on positional relationships depicted in the drawings. Furthermore, dimensional ratios in the drawings are not limited to the depicted ratios. In addition, it is to be understood that the embodiments described below are for illustrative purposes only and are not intended to limit the present invention thereto.

FIG. 1 is a perspective view showing a cutting tool 1 according to a first embodiment of the present invention. It should be noted that, in the following description, a cutting insert is referred to as the cutting tool 1. However, the cutting insert and a holder 2 (FIG. 9) to which the cutting insert is detachably mounted may be collectively referred to as the cutting tool 1. In the following description, a cutting insert is merely referred to as the cutting tool 1 as an example.

Figure 6:
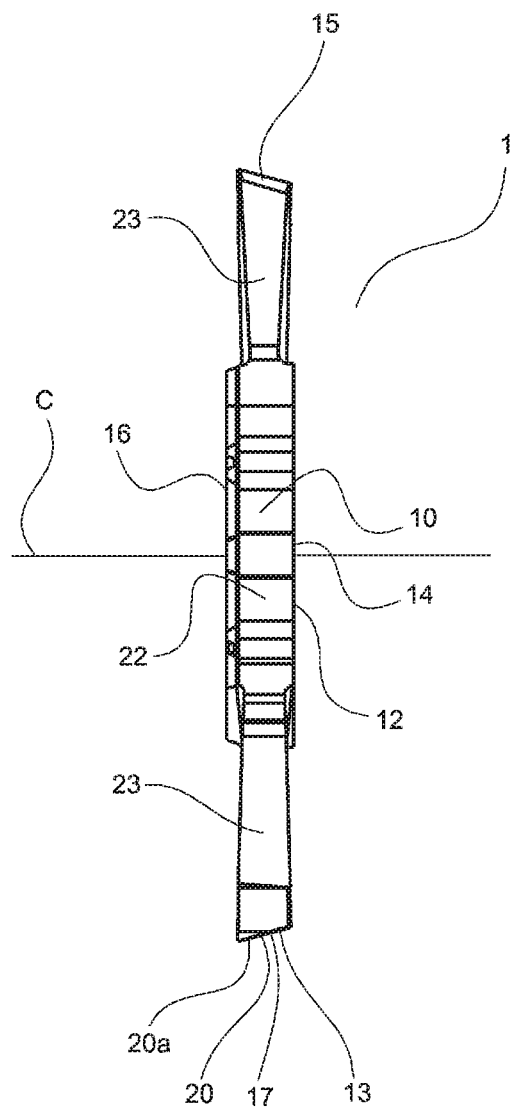
FIG. 6 is a plan view of the cutting tool shown in FIG. 1.
Figure 7:
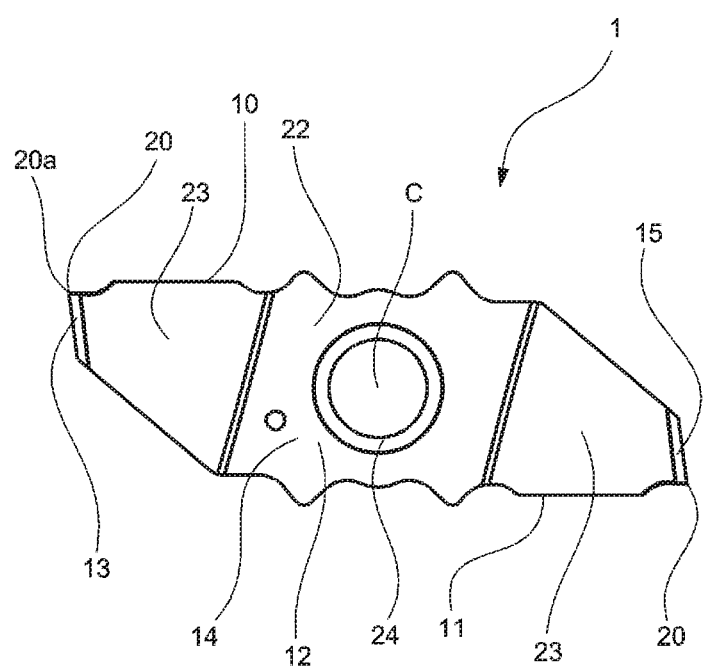
FIG. 7 is a right side view of the cutting tool shown in FIG. 1.
Figure 8:
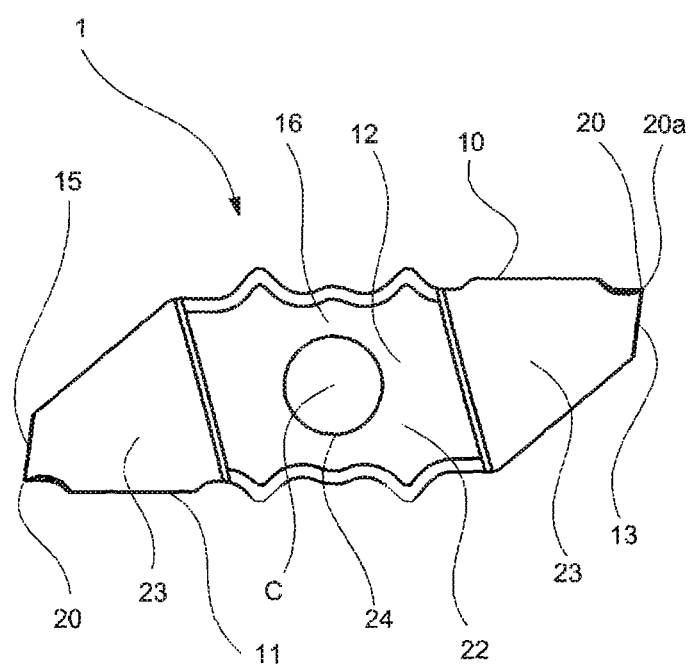
FIG. 8 is a left side view of the cutting tool shown in FIG. 1.

FIGS. 1 to 3 and 6 to 8 show a shape of the cutting tool 1. The cutting tool 1 has a base 22 and two cutting parts 23 which respectively protrude from the base 22 toward one end side and another end side in a longitudinal direction of the cutting tool 1. As shown in FIG. 6, the cutting tool 1 has an approximately polygonal first end surface 10. In the first end surface 10, a portion corresponding to the base 22 held by the holder 2 is approximately square (approximately rectangular) in an end view (or a top view) from a direction opposing the first end surface 10. In addition, in the first end surface 10, a portion of the two cutting parts 23 involved in cutting are connected to both longitudinal ends of the base 22 in an end view as described above. As shown in the drawings, a length in a lateral direction gradually increases toward both ends in a longitudinal direction from a connecting part connecting with the base 22. Furthermore, the cutting tool 1 has a second end surface 11 which opposes the first end surface 10. In this description, for the sake of convenience, the first end surface 10 will be referred to as an upper surface and the second end surface 11 will be referred to as a lower surface. For example, as shown in FIG. 7, two protrusions are formed on a side of the first end surface 10 of the base 22 so as to protrude in a direction opposing the first end surface 10. As shown in FIG. 7, the protrusions are respectively formed on both sides of a hole 24 in the longitudinal direction of the cutting tool 1. In a similar manner, two protrusions are formed on a side of the second end surface 11 of the base 22 so as to protrude in a direction opposing the second end surface 11. As will be described later, during cutting, the cutting tool 1 is fixed to the holder 2 by bringing a part of the fourth side surface 16 into contact with the holder 2 using a male screw inserted into the hole 24 and, at the same time, bringing at least respective parts of the first end surface 10 and the second end surface 11 into contact with the holder 2. The cutting tool 1 has a peripheral side surface 12 which connects between the upper surface 10 and the lower surface 11. The peripheral side surface 12 circumferentially has first to fourth side surfaces 13, 14, 15, and 16 which constitute four side surface portions in this order. In this description, a side of the first side surface 13 will be referred to as front. The cutting tool 1 has a cutting edge 20 in an intersecting ridge part along the upper surface 10 and the peripheral side surface 12. In other words, at least a part of the connecting part between the upper surface 10 and the peripheral side surface 12 functions as the cutting edge 20. The cutting tool 1 also has a cutting edge 20 in an intersecting ridge part along the lower surface 11 and the peripheral side surface 12. For example, as shown in FIG. 1, the cutting tool 1 has the hole 24 which, for example, perpendicularly penetrates the second side surface 14 and the fourth side surface 16. Moreover, the second and fourth side surfaces 14 and 16 have wider areas than the upper surface 10 and the lower surface 11. In the fourth side surface 16, a portion of the base 22 has, in a periphery of the hole 24, a flat surface part that becomes a seating surface when mounted to the holder 2 (FIG. 9) to be described later. The flat surface part is a portion corresponding to the base 22 in FIG. 8. The flat surface part is an approximate parallelogram. As shown in FIGS. 6 and 8, an intersecting ridge part along the fourth side surface 16 and the upper surface 10 of the base 22 has a large chamfered surface. In a similar manner, an intersecting ridge part along the fourth side surface 16 and the lower surface 11 of the base 22 has a large chamfered surface. A size of the chamfered surfaces is, for example, approximately 0.5 mm.

Figure 9:
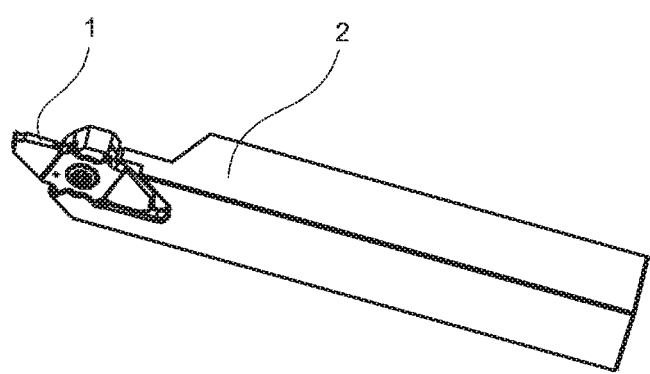
FIG. 9 is a perspective view of a state where the cutting tool shown in FIG. 1 is mounted to a holder.

As shown in FIG. 9, the cutting tool 1 can be mounted to the holder 2 which is shaped like, for example, a square pillar which is elongated in one direction. The cutting tool (cutting insert) 1 can be fixed to the holder 2 using a clamping member such as a fastening screw by pressing the hole 24 with the clamping member. For example, by providing the holder 2 with a female screw, inserting a male screw into the hole 24 and screwing the male screw with the female screw, and pressing a portion of the base 22 in the second side surface 14 with a head part of the male screw in a direction of the holder 2, the cutting tool 1 can be mounted to the holder 2 by bringing the portion of the base 22 in the fourth side surface 16 of the cutting tool 1 into contact in a direction of the holder 2. In the cutting tool 1, for example, the upper surface 10, the lower surface 11, and the fourth side surface 16 come into contact with an insert seat of the holder 2. In this case, since two protrusions are respectively formed on the side of the upper surface 10 and the side of the lower surface 11 of the base 22, by respectively providing the insert seat with wall parts having curved surfaces that conform to the sides of the upper surface 10 and the lower surface 11 of the base 22 so as to oppose a surface configured of a curved surface of one of or both of the two protrusions and bringing the surface configured of the curved surface of one of or both of the two protrusions into contact with the wall parts of the insert seat of the holder 2 during cutting, the cutting tool 1 can be fixed to the holder 2 in a stable manner even with respect to a direction of rotation of a workpiece. When the hole 24 of the cutting tool 1 is pressed by a fastening screw, the hole 24 may be constructed so as to have an enlarged diameter part toward the second side surface 14. In other words, the hole 24 may be constructed so that a shaft of the fastening screw can pass through a minimum diameter part of the hole 24 and a head part of the fastening screw comes into contact with the enlarged diameter part of the hole 24.

The cutting tool 1 according to the present embodiment has a shape that is 180 degrees rotationally symmetric around a central axis C of the hole 24. Therefore, the cutting tool 1 has two cutting edges 20 with a same shape. The following description will focus on one cutting edge 20, and since the other cutting edge 20 is similar thereto, a description of the other cutting edge 20 will be omitted. It is assumed that the same logic applies to peripheral shapes other than the cutting edges 20. However, as shown in FIGS. 1 and 7, a symbol or the like for providing an indication of an order of use of the cutting edges may be added to the cutting tool 1. The cutting tool 1 according to the present embodiment has a round concave symbol at one location on a side of one cutting edge 20. Asymmetry due to having such a symbol is permissible.

Figure 3:
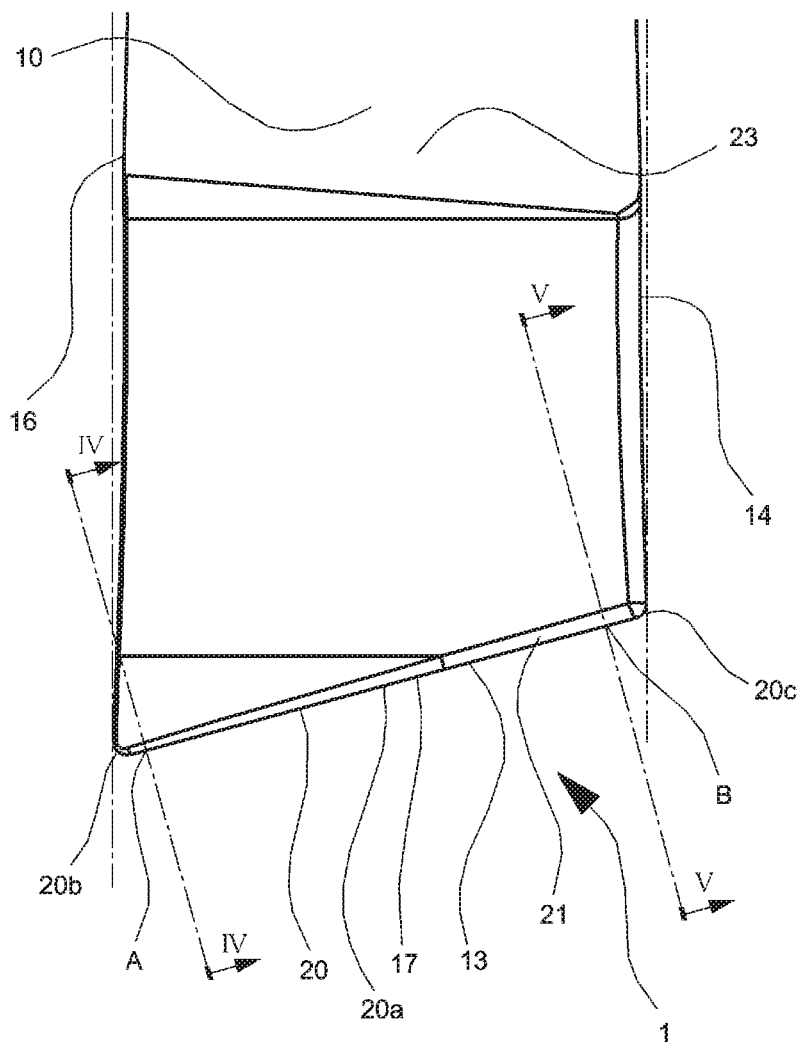
FIG. 3 is a partially enlarged plan view of the cutting tool shown in FIG. 1.

As shown in FIG. 3, a first ridge line 17 is formed between the upper surface 10 and the first side surface 13, and the first ridge line 17 includes a first cutting edge 20a. In this description, the first cutting edge 20a will be referred to as a front cutting edge. In addition, a second ridge line 18 is formed between the upper surface 10 and the second side surface 14, and a third ridge line 19 is formed between the upper surface 10 and the fourth side surface 16. A first corner cutting edge 20b is arranged between the first cutting edge 20a and the third ridge line 19. A second corner cutting edge 20c is arranged between the first cutting edge 20a and the second ridge line 18. In the first cutting edge 20a, a side of the first corner cutting edge 20b protrudes outward relative to a side of the second corner cutting edge 20c. Specifically, in FIG. 3 which is a view from a direction opposing the upper surface 10, a left side of the first cutting edge 20a descends downward. In other words, when viewed from a direction opposing the upper surface 10, a direction in which the first cutting edge 20a extends is at an acute angle to the fourth side surface 16. Therefore, as shown in the top view presented in FIG. 6, when a central axis C which perpendicularly penetrates a central part of the second side surface 14 and a central part of the fourth side surface 16 in the base 22 of the cutting tool 1 is used as a reference, the first cutting edge 20a is inclined relative to the second side surface 14 and the fourth side surface 16 toward the fourth side surface 16 from the second side surface 14 so that a distance between the central axis C and the first cutting edge 20a becomes greater. Furthermore, the second side surface 14 and the fourth side surface 16 in the cutting parts 23 are also slightly inclined relative to a direction perpendicular to the central axis C. Specifically, in a top view, the fourth side surface 16 is inclined relative to a direction perpendicular to the central axis C as a distance from the first corner cutting edge 20b formed in an end part of the first cutting edge 20a formed on the first ridge line 17 connecting the upper surface 10 and the first side surface 13 to each other becomes greater and a distance from the central axis C becomes smaller. In addition, the second side surface 14 is inclined relative to a direction perpendicular to the central axis toward the fourth side surface 16 as a distance from the second corner cutting edge 20c formed in another end part of the first cutting edge 20a becomes greater and a distance from the central axis C becomes smaller. Therefore, for example, as shown in FIG. 6, a width in a lateral direction of the cutting part 23 in a top view gradually increases as a distance from the base 22 increases and a distance from the first side surface 13 or the third side surface 15 becomes smaller. The first cutting edge 20a forms an interior angle relative to the fourth side surface 16 and extends in a direction of, for example, approximately 85 degrees. A length of the first cutting edge 20a is, for example, approximately 2 mm. When viewed from a direction opposing the upper surface 10, the first corner cutting edge 20b forms a substantially arc shape and a radius of curvature thereof is, for example, approximately 0.2 mm. When viewed from a direction opposing the upper surface 10, the second corner cutting edge 20c forms a substantially arc shape and a radius of curvature thereof is, for example, approximately 0.2 mm. When the cutting tool 1 is mounted to the holder 2, a cutting-off process is performed by, for example, moving the cutting tool 1 in a perpendicular direction to the central axis C relative to a workpiece which rotates around an axis that is parallel to the central axis C. Therefore, in the length of the first cutting edge 20a, a circumscribed dimension from the first corner cutting edge 20b to the second corner cutting edge 20c which corresponds to a width of a cutting-off process or a grooving process relative to a workpiece is, for example, approximately 2 mm.

A circumscribed dimension from the second side surface 14 to the fourth side surface 16 of the cutting tool 1 is, for example, approximately 3 mm. A circumscribed dimension from the first side surface 13 to the third side surface 15 of the cutting tool 1 is, for example, approximately 28 mm. A circumscribed dimension from the upper surface 10 to the lower surface 11 of the cutting tool 1 is, for example, approximately 11 mm. A diameter of the hole 24 is, for example, approximately 5 mm at a smallest part thereof. The hole 24 has a shape that accommodates, for example, an M4.5 (metric screw thread) fastening screw.

Figure 4:
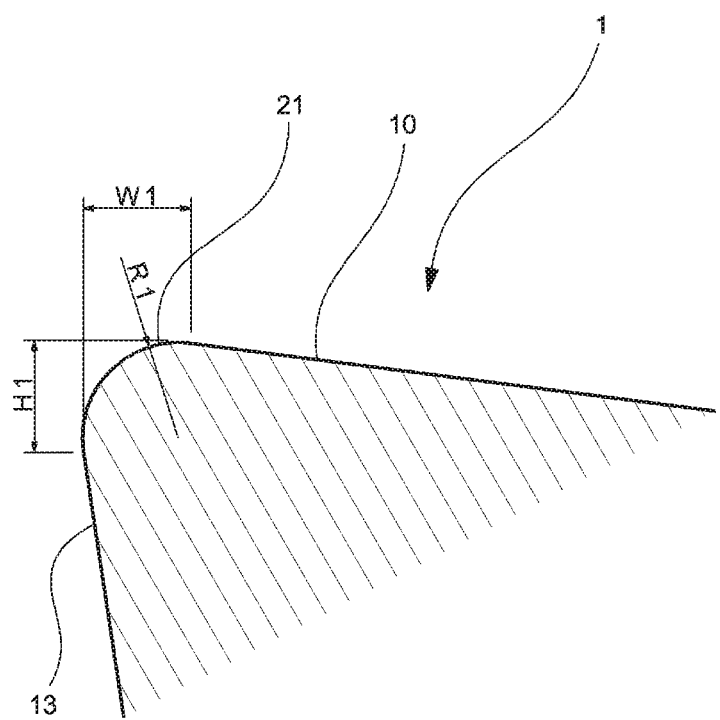
FIG. 4 is an enlarged sectional view taken along a IV-IV cross section in FIG. 3.
Figure 5:
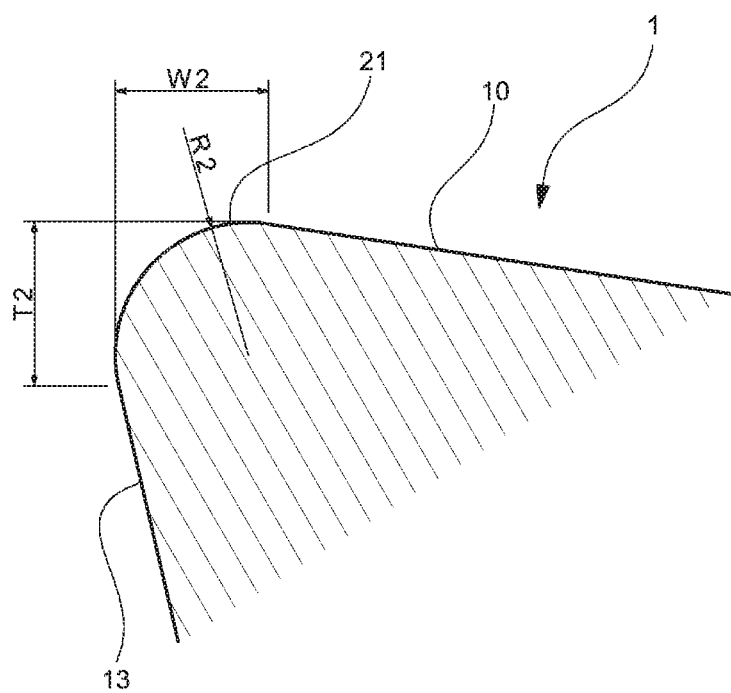
FIG. 5 is an enlarged sectional view taken along a V-V cross section in FIG. 3.

As shown in FIG. 3, a honing surface 21 is added to the cutting edge 20. Two arbitrary points defined on the cutting edge 20 will be respectively referred to as a first point A and a second point B. The first point A is a point closer to a side of the first corner cutting edge 20b than the second corner cutting edge 20c, and the second point B is a point closer to a side of the second corner cutting edge 20c than the first corner cutting edge 20b. In this case, the first and second points A and B are arranged at outermost positions on the honing surface 21. The first point A is positioned further toward an outer side of the cutting tool 1 (longitudinally outward in an end view, outward in a direction perpendicular to the central axis C in an end view) than the second point B. FIG. 4 shows a sectional shape of the cutting edge 20 (the honing surface 21) along a IV-IV cross section in FIG. 3, and FIG. 5 shows a sectional shape of the cutting edge 20 (the honing surface 21) along a V-V cross section in FIG. 3. Specifically, FIGS. 4 and 5 show sectional shapes of the cutting edge 20 along the IV-IV cross section and the V-V cross section which are perpendicular to the first cutting edge 20a and also perpendicular to the upper surface 10. The IV-IV cross section is a cross section which passes through the first point A on the side of the first corner cutting edge 20b, and the V-V cross section is a cross section which passes through the second point B on the side of the second corner cutting edge 20c. As shown in FIG. 4, a radius of curvature of the cutting edge 20 (the honing surface 21) along the IV-IV cross section is defined as a first radius of curvature R1. As shown in FIG. 5, a radius of curvature of the cutting edge 20 (the honing surface 21) along the V-V cross section is defined as a second radius of curvature R2. A sectional shape of the cutting edge 20 on the side of the first corner cutting edge 20b is a substantially arc shape in which the first radius of curvature R1 is, for example, approximately 0.03 mm. A sectional shape of the cutting edge 20 on the side of the second corner cutting edge 20c is a substantially arc shape in which the second radius of curvature R2 is, for example, approximately 0.05 mm. In other words, the first radius of curvature R1 is set to approximately 60% relative to the second radius of curvature R2. Moreover, when the cutting tool 1 according to the present embodiment is viewed as a whole, since the upper surface 10 and the lower surface 11 are parallel to each other, the IV-IV cross section and the V-V cross section which are perpendicular to the upper surface 10 are also perpendicular to the lower surface 11.

As shown in FIG. 4, a width of the cutting edge 20 (the honing surface 21) along the IV-IV cross section as viewed from a direction opposing the upper surface 10 is defined as a first width W1. As shown in FIG. 5, a width of the cutting edge 20 (the honing surface 21) along the V-V cross section as viewed from a direction opposing the upper surface 10 is defined as a second width W2. In the cutting tool 1 according to the present embodiment, the first width W1 on the side of the first corner cutting edge 20b is, for example, approximately 0.03 mm, and the second width W2 on the side of the second corner cutting edge 20c is, for example, approximately 0.05 mm. In other words, the first width W1 is set to approximately 60% relative to the second width W2. In addition, as shown in FIG. 3, the cutting edge 20a has the honing surface 21 over an entire range of the cutting edge 20a from one end thereof connecting to the first corner cutting edge 20b of the cutting edge 20a to the other end thereof connecting to the second corner cutting edge 20c of the cutting edge 20a and, in an end view, a width of the honing surface 21 gradually increases (in other words, monotonically increases). Therefore, in an end view, an angle formed between the fourth side surface 16 in the cutting part 23 and a boundary line between the honing surface 21 of the cutting edge 20a and the rake surface of the upper surface 10 is smaller than an angle formed between the fourth side surface 16 in the cutting part 23 and a boundary line that is farthest from the central axis C of the cutting edge 20a. Moreover, a region in which the honing surface 21 has a constant width may be partially provided. In addition, portions in which the width of the honing surface 21 is locally reduced may be provided in both end parts of the cutting edge 20a. However, a region in which a honing width in an end view gradually increases is favorably formed over at least half of the cutting edge 20a.

As shown in FIG. 4, a height of the cutting edge 20 (the honing surface 21) along the IV-IV cross section as viewed from a direction opposing the first side surface 13 is defined as a first height H1. As shown in FIG. 5, a height of the cutting edge 20 (the honing surface 21) along the V-V cross section as viewed from a direction opposing the first side surface 13 is defined as a second height H2. In the cutting tool 1 according to the present embodiment, the first height H1 on the side of the first corner cutting edge 20b is, for example, approximately 0.03 mm, and the second height H2 on the side of the second corner cutting edge 20c is, for example, approximately 0.05 mm. In other words, the first height H1 is set to approximately 60% relative to the second height H2. In addition, in a similar manner to the honing amount on a side of a rake surface in an end view, when viewed from a direction opposing the first side surface 13, the cutting edge 20a also has the honing surface 21 over an entire range of the cutting edge 20a from one end thereof connecting to the first corner cutting edge 20b of the cutting edge 20a to the other end thereof connecting to the second corner cutting edge 20c of the cutting edge 20a, and a width of the honing surface 21 gradually increases (in other words, monotonically increases). Moreover, a region in which the honing surface 21 has a constant width may be partially provided. In addition, portions in which the width of the honing surface 21 is locally reduced may be provided in both end parts of the cutting edge 20a. However, a region in which a honing width in a side view gradually increases or remains constant is favorably formed over at least half of the cutting edge 20a.

A portion of the peripheral side surface 12 which connects to the cutting edge 20 functions as a flank. In the cutting tool 1 according to the present embodiment, the cutting tool 1 itself imparts a positive relief angle to a portion of the first side surface 13 which connects to the first cutting edge 20a. The relief angle imparted by the cutting tool 1 itself is, for example, approximately 7 degrees.

The cutting tool 1 has a chip breaker on the upper surface 10. A portion of the upper surface 10 which connects to the cutting edge 20 functions as a rake surface. In the cutting tool 1 according to the present embodiment, the cutting tool 1 itself imparts a positive rake angle to a portion of the upper surface 10 which connects to the first cutting edge 20a. In this case, a "positive rake angle" refers to an angle in a case where the upper surface 10 is inclined so as to become closer the second end surface 11 as a distance from the first cutting edge 20a increases. The rake angle imparted by the cutting tool 1 itself is, for example, approximately 20 degrees. Therefore, the cutting tool 1 has a positive rake angle and a positive relief angle and, at the same time, the second side surface 14 and the fourth side surface 16 are also inclined so that a width in a lateral direction in an end view decreases as a distance from the first cutting edge 20a increases. Therefore, sharpness of the first cutting edge 20a and, in particular, smoothness of a finished surface of a workpiece can be ensured. In addition, a possibility of the second side surface 14 and the fourth side surface 16 impacting a finished surface and the like during cutting by the first cutting edge 20a can be reduced and preferable cutting by the first cutting edge 20a can be realized.

Next, a cutting tool 100 according to a second embodiment will be described. The description of the cutting tool 100 will focus on its main differences from the cutting tool 1 according to the first embodiment, and same components will be denoted by same reference signs and descriptions thereof will be omitted.

Figure 10:
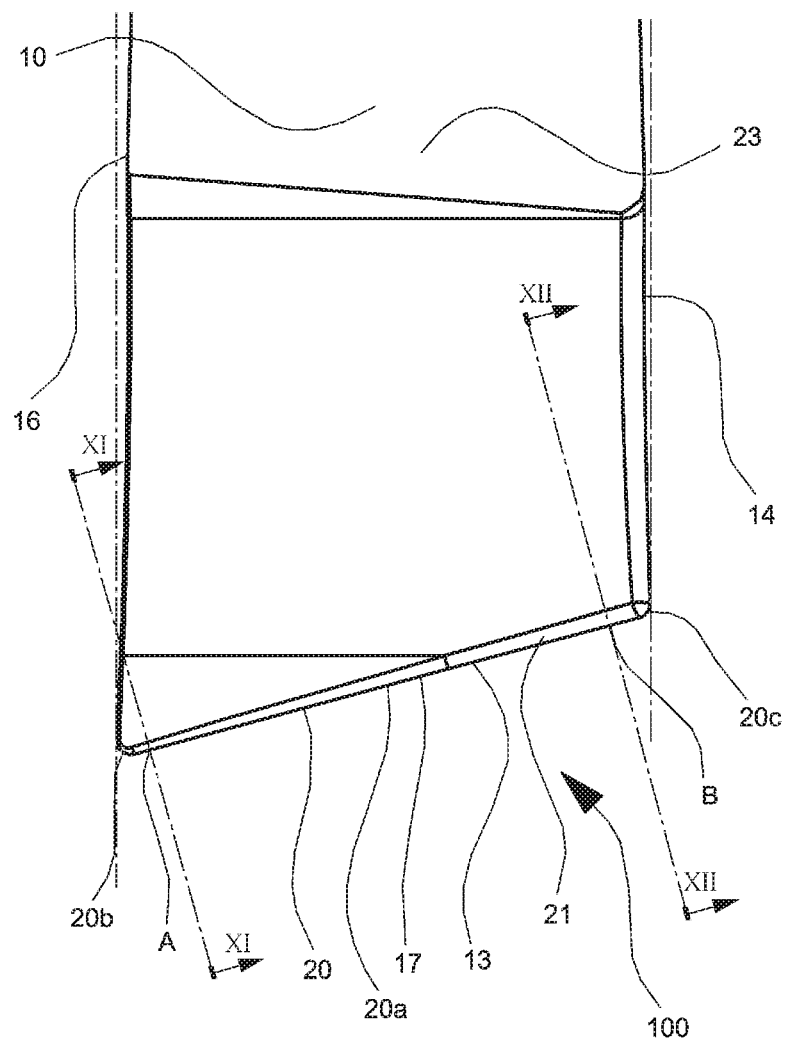
FIG. 10 is a partially enlarged plan view of a cutting tool according to a second embodiment of the present invention.

As shown in FIG. 10, the cutting tool 100 has a similar shape to the cutting tool 1. A coating film 101 created by CVD is provided on a surface of the cutting tool 100.

Figure 11:
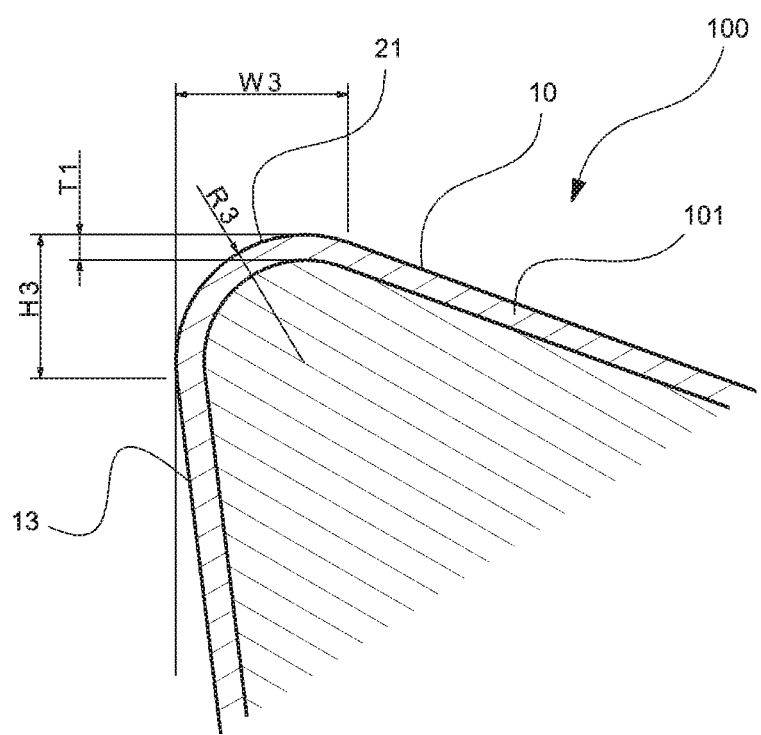
FIG. 11 is an enlarged sectional view taken along an XI-XI cross section in FIG. 10.
Figure 12:
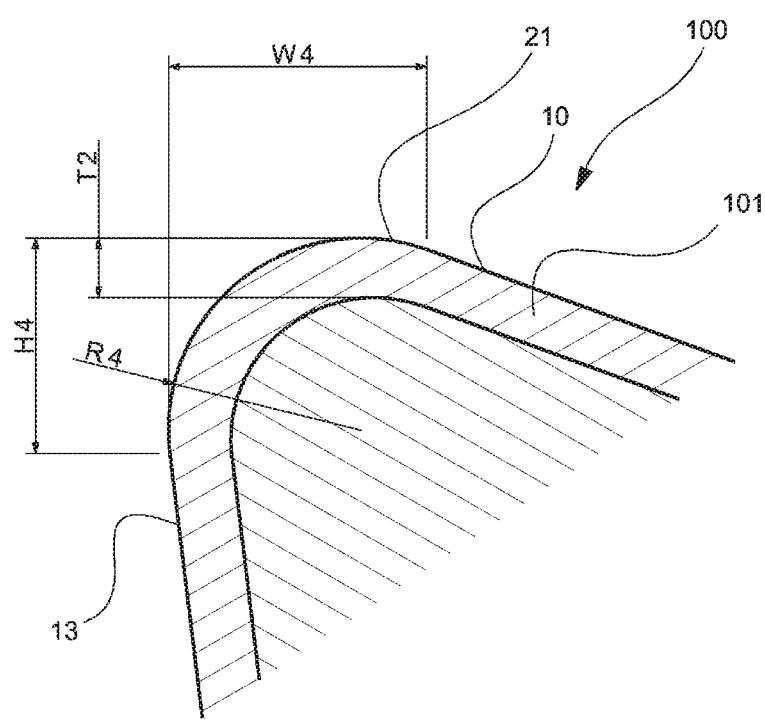
FIG. 12 is an enlarged sectional view taken along a XII-XII cross section in FIG. 10.

FIGS. 11 and 12 show sectional shapes of the cutting edge 20 along an XI-XI cross section and a XII-XII cross section in FIG. 10. Specifically, FIGS. 11 and 12 show sectional shapes of the cutting edge 20 along the XI-XI cross section and the XII-XII cross section which are perpendicular to the first cutting edge 20a and also perpendicular to the upper surface 10. The XI-XI cross section is a cross section which passes through the first point A on the side of the first corner cutting edge 20b, and the XII-XII cross section is a cross section which passes through the second point B on the side of the second corner cutting edge 20c. As shown in FIG. 11, an average thickness of the coating film of the cutting edge 20 (the honing surface 21) along the XI-XI cross section is defined as a first thickness T1. An average thickness as used herein refers to a thickness from which influences of minute irregularities on a surface or an interface of the coating film 101 have been eliminated. In addition, even when thicknesses differ between a rake surface side and a flank side, a comparison is favorably performed by averaging the thicknesses. As shown in FIG. 12, an average thickness of the coating film of the cutting edge 20 (the honing surface 21) along the XII-XII cross section is defined as a second thickness T2. In the cutting tool 100 according to the present embodiment, the first thickness T1 is, for example, approximately 5 μm, and the second thickness T2 is, for example, approximately 10 μm. In other words, the first thickness T1 is set to approximately 50% relative to the second thickness T2. In other words, a difference between the first thickness T1 and the second thickness T2 is set to approximately 50% relative to the second thickness T2.

As shown in FIG. 11, a radius of curvature of the cutting edge 20 (the honing surface 21) along the XI-XI cross section is defined as a third radius of curvature R3. As shown in FIG. 12, a radius of curvature of the cutting edge 20 (the honing surface 21) along the XII-XII cross section is defined as a fourth radius of curvature R4. In the cutting tool 100 according to the present embodiment, a sectional shape of the honing surface 21 on the side of the first corner cutting edge 20b is a substantially arc shape in which the third radius of curvature R3 is, for example, approximately 0.03 mm. In addition, a sectional shape of the honing surface 21 on the side of the second corner cutting edge 20c is a substantially arc shape in which the fourth radius of curvature R4 is, for example, approximately 0.05 mm. In other words, the third radius of curvature R3 is set to approximately 60% relative to the fourth radius of curvature R4.

As shown in FIG. 11, a width of the cutting edge 20 (the honing surface 21) along the XI-XI cross section as viewed from a direction opposing the upper surface 10 is defined as a third width W3. As shown in FIG. 12, a width of the cutting edge 20 (the honing surface 21) along the XII-XII cross section as viewed from a direction opposing the upper surface 10 is defined as a fourth width W4. In the cutting tool 100 according to the present embodiment, the third width W3 on the side of the first corner cutting edge 20b is, for example, approximately 0.03 mm, and the fourth width W4 on the side of the second corner cutting edge 20c is, for example, approximately 0.05 mm. In other words, the third width W3 is set to approximately 60% relative to the fourth width W4.

As shown in FIG. 11, a height of the cutting edge 20 (the honing surface 21) along the XI-XI cross section as viewed from a direction opposing the first side surface 13 is defined as a third height H3. As shown in FIG. 12, a height of the cutting edge 20 (the honing surface 21) along the XII-XII cross section as viewed from a direction opposing the first side surface 13 is defined as a fourth height H4. In the cutting tool 100 according to the present embodiment, the third height H3 on the side of the first corner cutting edge 20b is, for example, approximately 0.03 mm, and the fourth height H4 on the side of the second corner cutting edge 20c is, for example, approximately 0.05 mm. In other words, the third height H3 is set to approximately 60% relative to the fourth height H4.

While a material of a periphery of the cutting edge 20 of the cutting tool 1 or 100 is not particularly limited, for example, the material may be selected from hard materials such as cemented carbide, cermet, ceramic, and a sintered body containing cubic boron nitride, materials obtained by applying a coating film created by PVD or CVD to the surface of these hard materials, or monocrystalline diamond or a sintered body including diamond.

The cutting tool (cutting insert) 1 or 100 configured as described above is manufactured as follows. First, raw material is press-molded and sintered to form an outer shape of the cutting tool 1. Subsequently, a grinding process or the like is performed as necessary. The honing surface 21 is also formed at this point. In addition to cutting processing using an abrasive wheel, the honing surface 21 can be formed by various known methods such as cutting processing using a brush, cutting processing using loose grains, cutting processing using a rubber wheel, and cutting processing using laser beams. The shape of the honing surface 21 can be adjusted by adjusting cutting processing conditions in accordance with a machined portion of the cutting edge 20. For example, in the case of cutting processing using a brush, a sectional shape and various dimensions of the honing surface 21 to be formed can be adjusted by varying an angle at which the brush is brought into contact with the honing surface 21. For example, a honing surface similar to the honing surface 21 according to the embodiments can be obtained by adjusting the angle at which the brush is brought into contact with the honing surface 21 so that the side of the first corner cutting edge is weakly contacted but the side of the second corner cutting edge is strongly contacted.

The coating film 101 created by CVD or PVD is further added as necessary. In addition, when varying a thickness of the coating film 101, a part of the coating film 101 is removed. Examples of a method of removing a part of the coating film 101 include cutting processing using a brush. With cutting processing using a brush, an amount of removal can be adjusted by varying how the brush abuts the cutting edge 20 or 120 to be processed. For example, how the brush abuts the cutting edge 20 or 120 to be processed is adjusted so that the brush strongly abuts the side of the first corner cutting edge 20b but weakly abuts the side of the second corner cutting edge 20c. For example, a film thickness of the coating film 101 can be adjusted by varying an angle at which the brush is brought into contact with the cutting edge 20 or 120. Undergoing such manufacturing steps enables the cutting tool 1 to be manufactured which not only has the honing surface but also has the coating film 101, the thickness of which gradually increases toward the second corner cutting edge 20c from the side of the first corner cutting edge 20b. Other methods of partially removing the coating film 101 include cutting processing using loose grains and cutting processing using laser beams.

However, methods of varying the thickness of the coating film 101 are not limited to methods of removing a part of the coating film 101. For example, the thickness of the coating film 101 may be generated in an inclined manner by adjusting conditions during coating. Examples of a method of adjusting conditions during coating include a method of creating a shade using a shield in PVD. When a shade is created with a shield, basically, the coating film 101 is no longer formed in the shaded portion. The film thickness of the coating film 101 can be adjusted by moving the shield during coating. For example, by starting to create a shade using a shield in a part of the cutting edge 20 or 120 once the coating film 101 with the thickness of a thin portion has been formed and subsequently gradually moving the shield, the cutting tool 1 or 100 can be manufactured of which the film thickness of the coating film 101 gradually varies toward an arbitrary film thickness based on the position of the cutting edge 20 or 120. Alternatively, the film thickness of the coating film 101 can be adjusted by arranging the shield at a position slightly separated from the cutting edge 20 or 120. Arranging the shield at a position slightly separated from the cutting edge 20 or 120 enables a depth of the shade at a boundary part to be gradually varied and, as a result, enables the thickness of the coating film 101 on the cutting edge 20 or 120 to be gradually varied. As described above, when applying the coating film 101 by PVD or the like, the thickness of the coating film 101 on the cutting edge 20 or 120 can be gradually varied by arranging a shield between the cutting edge 20 or 120 and a target of a coating material and performing coating while relatively moving the shield with respect to the target of the coating material and the cutting edge 20 or 120 or, more specifically, by performing coating while relatively moving the shield so that, from an initial state where a vicinity of the second corner cutting edge 20c on which the thickness of the coating film 101 is desirably increased is exposed but other regions including the first corner cutting edge 20b are shielded with respect to the target of the coating material, a region of the cutting edge 20 or 120 to be exposed with respect to the target of the coating material gradually increases.

The cutting tool 1 or 100 is mounted to the holder 2 by inserting a fastening screw into the hole 24 and tightening the fastening screw as shown in FIG. 9. A method of fixing the cutting tool 1 or 100 is not particularly limited and the cutting tool 1 or 100 may be fixed using a pressing piece or a wedge. During a turning process, a workpiece is fixed to a chuck of a lathe and rotated around a horizontal shaft. Subsequently, the side of the cutting edge 20 of the cutting tool 1 or 100 is brought close to the workpiece and the workpiece is cut by the cutting edge 20.

Next, an operation and effect of the cutting tool 1 according to the present embodiment will be described. In addition, a preferred mode of the present invention will also be described.

The cutting tool 1 is suitable for a cutting-off/grooving process by a lathe. When using the cutting tool 1 in a cutting-off/grooving process, the first cutting edge 20a is preferably considered a front cutting edge. A width of a processed groove is determined by the first cutting edge 20*a*, the first corner cutting edge 20*b*, and the second corner cutting edge 20*c*.

As described earlier, the honing surface 21 of the first cutting edge 20*a* is smaller on the side of the first corner cutting edge 20*b* than on the side of the second corner cutting edge 20*c*. For example, in a cutting-off process, when the first cutting edge 20*a* is considered a front cutting edge and the side of the first corner cutting edge 20*b* protrudes toward a side of a leading end, since the first corner cutting edge 20*b* acts as a finishing cutting edge of a processed surface of a workpiece to be cut off, a small sectional shape with excellent sharpness is favorable. Therefore, in the first corner cutting edge 20*b* and the first cutting edge 20*a* in a vicinity of the first point A which continues from the first corner cutting edge 20*b* in the cutting tool 1 according to the present embodiment, the cutting edge 20 is formed such that, for example, the honing surface 21 with a smaller curvature than the radius of curvature of the first corner cutting edge 20*b* in an end view is provided from the upper surface 10 constituting the rake surface to the first side surface 13 constituting the flank to ensure sharpness and smoothness of a processed surface. Conventionally, a honing surface is either not formed or formed in a same size over an entire region of the cutting edge, but the present inventors focused on the fact that, for example, during a cutting-off process, large cutting resistance acts on a cutting edge and may cause a fracture of the cutting edge. In particular, in a cutting-off process, a so-called "navel" (a conical protrusion having a center of rotation as an axis) which remains near a rotational axis of the workpiece must be broken off in order to cut off unnecessary portions of the workpiece and, in doing so, large cutting resistance acts on the cutting edge. Since the portions to be cut off in the workpiece gradually rotate slower due to the cutting-off process or the like and are also subjected to bending stress attributable to a weight of the portions to be cut off, in particular, the second corner cutting edge 20*c* and the cutting edge 20*a* in a periphery thereof may possibly be subjected to cutting resistance in a direction that differs from previous cutting. The cutting tool 1 according to the present embodiment ensures smoothness of a processing surface of a workpiece and fracture resistance by respectively bringing the fourth side surface 16, the first end surface 10, and the second end surface 11 on the side of the first corner cutting edge 20*b* into contact with the holder 2 to ensure stability of these portions and by reducing a honing width or the like of the honing surface 21 in a vicinity of the first point A near the first corner cutting edge 20*b*. On the other hand, since the second corner cutting edge 20*c* and the first cutting edge 20*a* in a vicinity of the second point B near the second corner cutting edge 20*c* are particularly subjected to large cutting resistance when cutting off a part of the workpiece by a cutting-off process, the second corner cutting edge 20*c* and the first cutting edge 20*a* in a vicinity thereof favorably have a large sectional shape that is less likely to chip when breaking off the conical protrusion (a so-called "navel") described above which remains near the rotational axis of the workpiece. The cutting tool 1 according to the present embodiment increases fracture resistance of the first cutting edge 20*a* by enlarging a honing width or the like of the honing surface 21 in this portion by, for example, a factor of 1.5 or more as compared to that of the honing surface 21 at the first point A. As described earlier, when taking a step of forming honing with a brush or the like into consideration, the honing surface 21 can be provided so that a maximum value of the honing width or the like is, for example, smaller than a radius of curvature of the second corner cutting edge 20*c* in an end view. While increasing the honing width or the like causes smoothness to decline, since the decline corresponds to portions that are cut off, normal cutting-off processes are not affected. In addition, even in a state where an end part of the workpiece is not cut off, cutting resistance in accordance with a weight of the end part of the workpiece to be cut off may increasingly act as a distance from the first point A becomes greater and a distance from the second point B becomes smaller. Therefore, the honing surface 21 is formed so that the honing width or the like thereof increases as a distance from the first point A, which is close to the fourth side surface 16 that is pressed by the holder 2 and therefore stable, becomes greater and a distance from the second point B becomes smaller, in order to suppress fracture of the cutting edge between the first point A and the second point B.

The sectional shape of the honing surface 21 favorably gradually increases from the side of the first corner cutting edge 20*b* toward the side of the second corner cutting edge 20*c*. The sectional shape of the honing surface 21 is not limited to a substantially arc shape. For example, an approximately linear shape, a complex shape combining at least one straight line and at least one arc, a complex shape combining a plurality of arcs, and an approximately elliptical shape can also be applied. Moreover, a substantially arc shape is favorable when used in a cutting-off/grooving process. When adopting a substantially arc shape, a radius of curvature is favorably 0.001 mm or more and 0.1 mm or less. A difference between a maximum value and a minimum value of the radius of curvature is favorably 0.003 mm or more and 0.1 mm or less. By adopting these numerical ranges, the cutting tool 1 or 100 which provides high processing surface quality of separated portions and which prevents abnormal damage such as fractures from occurring in the cutting edge 20 can be provided.

The thickness of the coating film is favorably increased so as to share the same tendency as the size of the honing surface 21. In other words, when the fourth radius of curvature R4 is larger than the third radius of curvature R3, the second thickness T2 is favorably greater than the first thickness T1. In a portion where the coating film is thin, sharpness of the cutting edge 20 can be improved in combination with a small honing surface. In a portion where the coating film is thick, greater resistance to wear is provided and a lifetime of the cutting tool 1 or 100 can be prolonged. A difference in thickness of the coating film is favorably 20% or more and 90% or less relative to the thickness of a thicker portion. When the difference in thickness of the coating film 101 is less than 20%, a significant effect as compared to a case of uniform film thickness is not observable and, even if honing near the second point B is increased, there is a possibility that the coating film may become readily damaged. Therefore, the thickness of the coating film is favorably increased so as to share the same tendency as the size of the honing surface 21. When the difference in thickness of the coating film 101 exceeds 90%, cost of manufacturing such coating films 101 tends to increase sharply.

Although embodiments of the present invention have been described above, various modifications may be made to the cutting tool according to the present invention. For example, while a shape suitable for a cutting-off/grooving process has been introduced in the embodiment described above, the shape is not restrictive. The cutting tool according to the present invention can be applied to cutting tools of various modes as long as one cutting edge is protruded and another cutting edge is retracted such as a cutting tool for a back turning process.

The cutting tool according to the present invention is not limited to a cutting tool in a mode of using a cutting insert. For example, the cutting tool according to the present invention can also be applied to a cutting tool in a mode using a brazed tip. In addition, the cutting tool according to the present invention is not limited to a turning tool and can also be applied to cutting tools in other modes such as a milling tool or a hole drilling tool.

Although preferred embodiments of the invention have been described using specific terms, the present invention is not limited thereto. It is to be understood that many changes and variations can be made to the invention without departing from the spirit or scope of the following claims. The present invention includes all kinds of modifications, applications and equivalents that are encompassed by the concepts of the present invention as defined by the scope of the claims.

What is claimed is:

1. A cutting insert, comprising:
   an upper surface on which a rake surface is formed;
   a first side surface which connects to the upper surface and on which a flank is formed;
   a second side surface which connects to the upper surface and the first side surface;
   a third side surface which connects to the upper surface and the second side surface;
   a fourth side surface which connects to the upper surface, the first side surface, and the third side surface;
   a lower surface which connects to the first side surface, the second side surface, the third side surface, and the fourth side surface; and
   a cutting edge which is formed in a region connecting the upper surface and the first side surface and which has a honing surface, wherein
   a hole penetrating the second side surface and the fourth side surface is formed,
   the cutting insert performs a cutting process in a state where the cutting insert is fixed to a holder by bringing a part of the fourth side surface into contact with the holder by using a male screw inserted into the hole and, at the same time, bringing at least respective parts of the upper surface and the lower surface into contact with the holder,
   the cutting edge is formed such that:
      in a top view from a direction opposing the upper surface, the cutting edge is inclined with respect to the second side surface and the fourth side surface so that a distance from the cutting edge to a central axis of the hole increases gradually toward the fourth side surface from the second side surface; and
      in the top view, a width of the honing surface continuously increases toward a second point, which is closer to the second side surface than to the fourth side surface on the cutting edge, from a first point which is closer to the fourth side surface than to the second side surface on the cutting edge.

2. The cutting insert according to claim 1, wherein
   the rake surface has a positive rake angle,
   the flank has a positive relief angle,
   the second side surface is inclined relative to a straight line perpendicular to the central axis so as to become closer to the fourth side surface as a distance from a region connecting with the first side surface becomes greater and a distance from the central axis becomes smaller in the top view, and
   the fourth side surface is inclined relative to a straight line perpendicular to the central axis so as to become closer to the second side surface as a distance from a region connecting with the first side surface becomes greater and a distance from the central axis becomes smaller in the top view.

3. The cutting insert according to claim 1, wherein in the region connecting the upper surface and the first side surface, a first corner cutting edge configured of an arc in the top view is formed in a region connecting with the fourth side surface and a second corner cutting edge configured of an arc in the top view is formed in a region connecting with the second side surface, and a maximum value of a width of the honing surface provided on the cutting edge in the top view is smaller than a radius of curvature of the first and second corner cutting edges.

4. The cutting insert according to claim 1, wherein a cross-sectional shape of the honing surface perpendicular to the cutting edge is a substantially arc shape.

5. The cutting insert according to claim 1, wherein the cutting edge has a portion, a radius of curvature of a cross-sectional shape perpendicular to the cutting edge of which gradually increases from the first point toward the second point.

6. The cutting insert according to claim 5, wherein a difference between a maximum value and a minimum value of the radius of curvature of the cross-sectional shape of the cutting edge is 0.003 mm or more and 0.1 mm or less.

7. The cutting insert according to claim 1, wherein the cutting tool has a coating film on a surface thereof and has a portion where a thickness of the coating film gradually increases from the first point toward the second point.

* * * * *